June 7, 1966     S. TONGRET     3,254,533
CLINICAL THERMOMETER
Filed Jan. 21, 1963     4 Sheets-Sheet 1
FIG. 1.
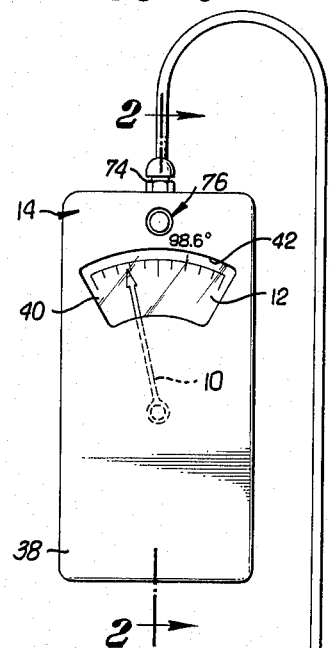
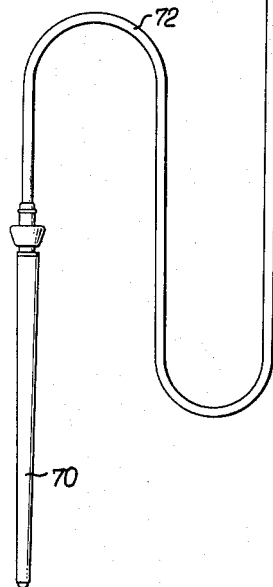
FIG. 2.
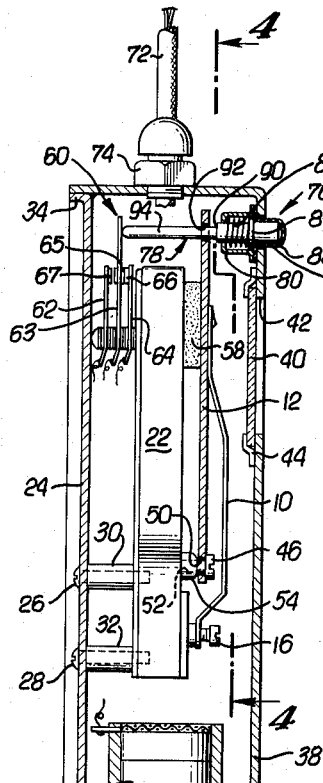
FIG. 3.
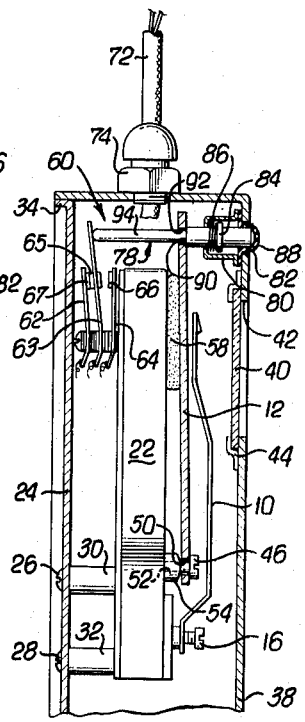
FIG. 13.
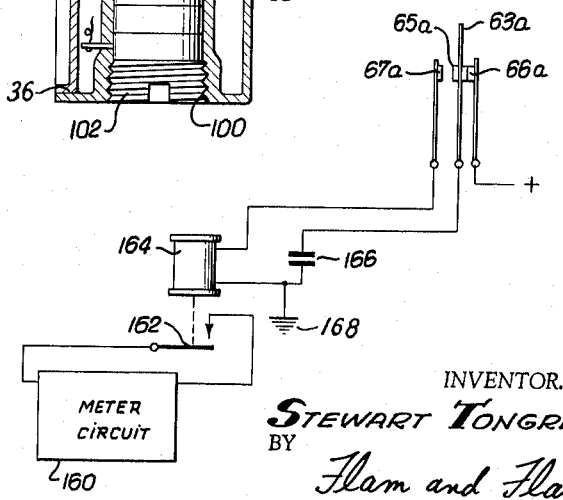
INVENTOR.
STEWART TONGRET
BY
Flam and Flam
ATTORNEYS.

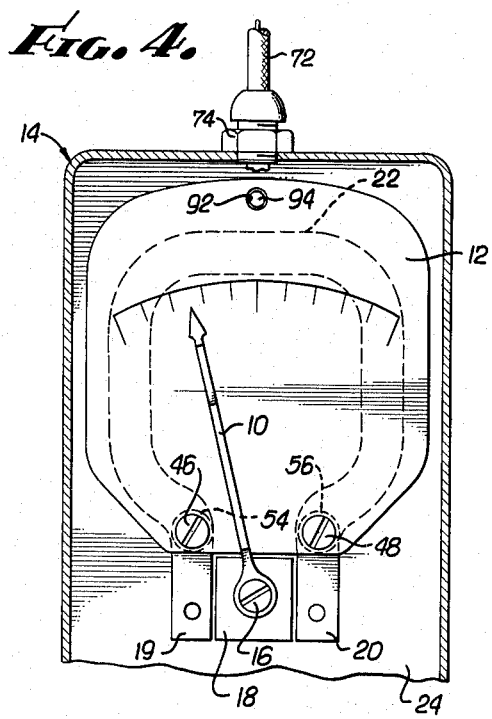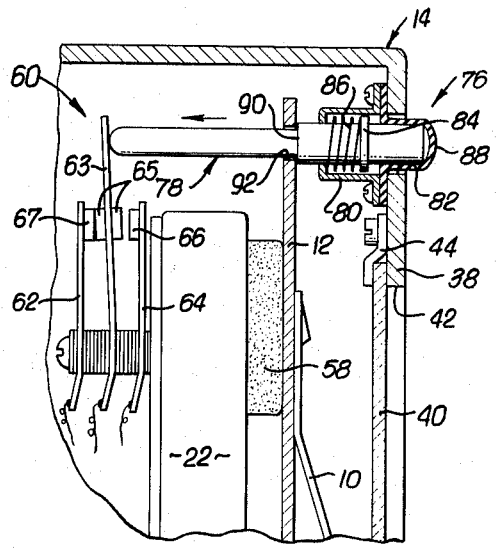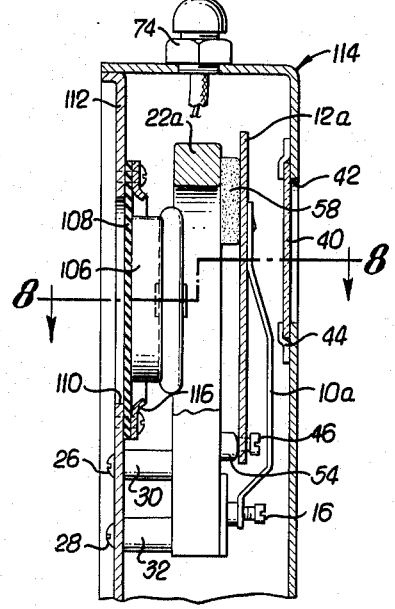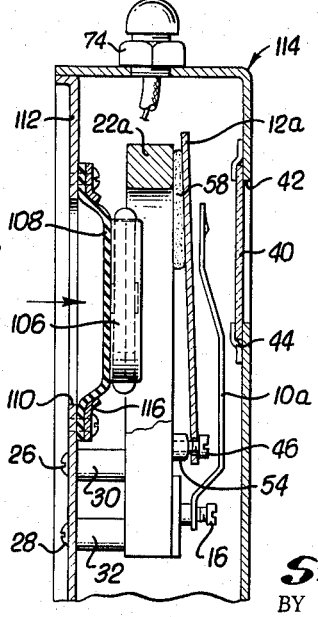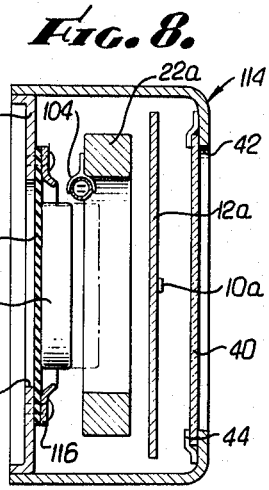

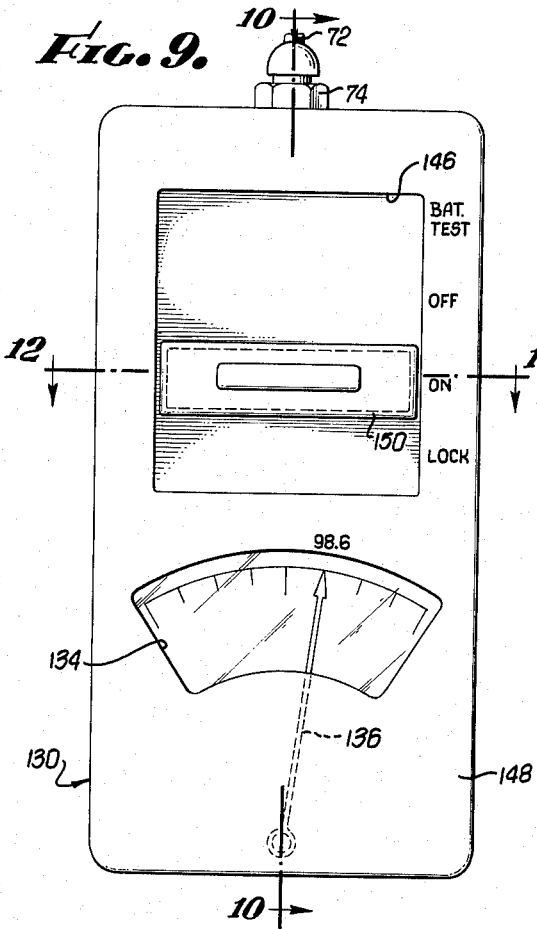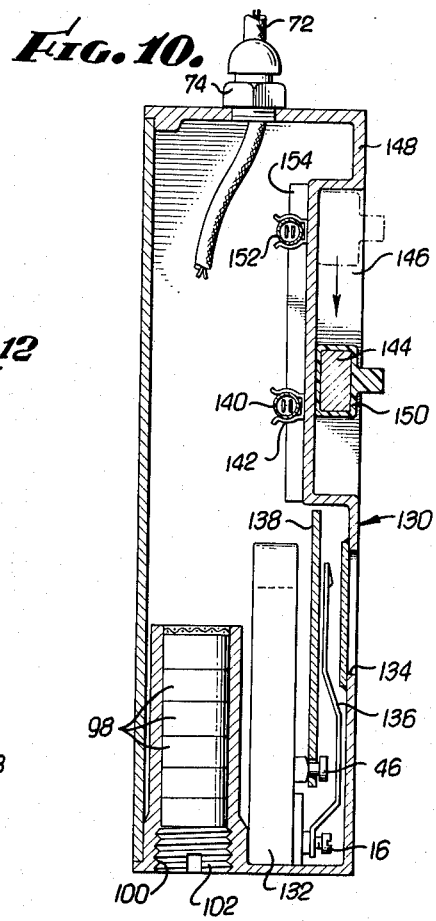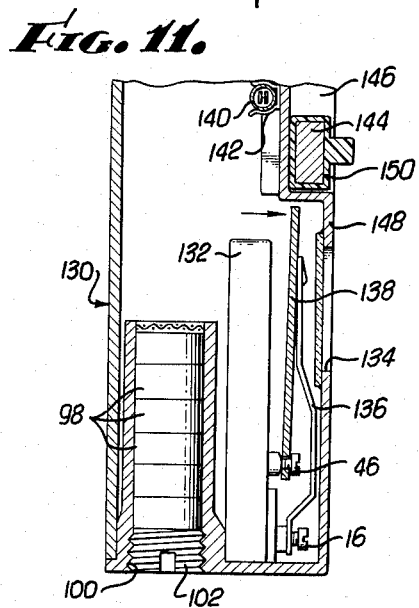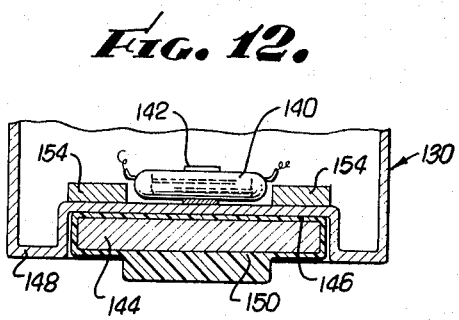

June 7, 1966  S. TONGRET  3,254,533
CLINICAL THERMOMETER
Filed Jan. 21, 1963  4 Sheets-Sheet 4
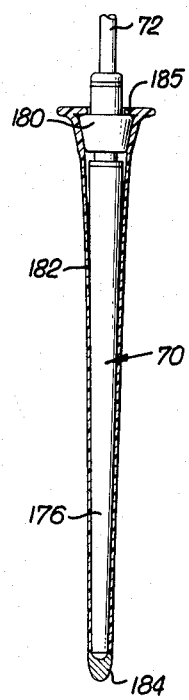
FIG. 14.
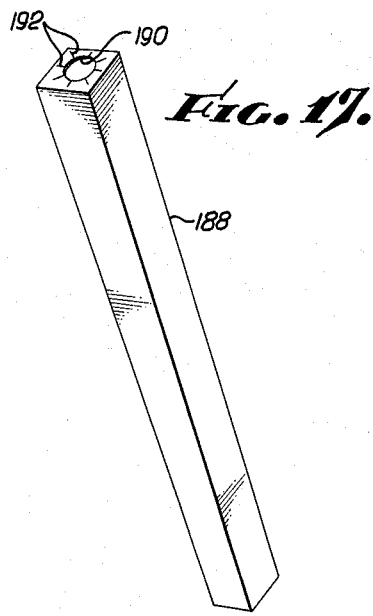
FIG. 15.
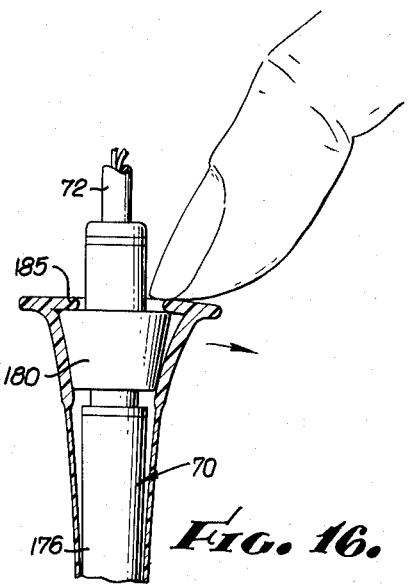
FIG. 16.
FIG. 17.
INVENTOR.
STEWART TONGRET
BY
Flam and Flam
ATTORNEYS.

United States Patent Office 3,254,533
Patented June 7, 1966

1

3,254,533
CLINICAL THERMOMETER
Stewart Tongret, Santa Monica, Calif.
(1309 N. Wilcox Ave., Los Angeles 28, Calif.)
Filed Jan. 21, 1963, Ser. No. 252,953
18 Claims. (Cl. 73—362)

This invention relates to a clinical thermometer.

In a conventional thermometer utilizing an expansible fluid medium, such as mercury, two or three minutes are usually required in order to allow for thermal equilibrium between the body of the subject and the expansible fluid. This period of time is actually very long especially from the standpoint of a doctor, nurse or attendant taking the temperature measurement. The attention of the person taking the measurement may be distracted and without constant supervision of the subject, there is a danger of taking a false measurement with possibly serious consequences.

It has heretofore been proposed to use, as a sensing element, a thermistor or other device that quickly reaches a thermal equilibrium with the body of the subject.

The primary object of this invention is to provide an improved thermometer of this type.

Another object of this invention is to provide a thermistor thermometer in which the reading is facilitated by a unique cooperation of an indicator clamp, an operating circuit, and a button, lever, or other actuator. The indicator is normally clamped in position. Upon moving the button, lever or other actuator, the operating circuit is first established, the clamp is released so that the indicator assumes the new position. Upon release of the actuator, the indicator is clamped at the new position before the operating circuit is interrupted. The reading accordingly is held pending its recording, if so desired, or for other purposes.

Another object of this invention is to provide a clinical thermometer of this character that is entirely sealed, for example, to facilitate sterilization.

Still another object of this invention is to provide a battery operated meter circuit energized for a controlled time period no matter for what length of time the actuator is held depressed, thereby conserving the battery charge and controlling the heating of the sensing element due to current flow.

Another object of this invention is to provide an arrangement for sanitary handling of a detachable probe shield both in its package and on the probe itself.

This invention possesses many other advantages, and has other objects which may be made more clearly apparent from a consideration of several embodiments of the invention. For this purpose, there are shown a few forms in the drawings accompanying and forming part of the present specification, and which drawings, unless as otherwise indicated, are true scale. These forms will now be described in detail, illustrating the general principles of the invention; but it is to be understood that this detailed description is not to be taken in a limiting sense, since the scope of the invention is best defined by the appended claims.

Referring to the drawings:

FIGURE 1 is a pictorial view of a thermometer incorporating the present invention;

FIG. 2 is an enlarged longitudinal sectional view taken along a plane corresponding to line 2—2 of FIG. 1;

FIG. 3 is a fragmentary sectional view similar to FIG. 2 but illustrating the parts with the actuator fully depressed;

FIG. 4 is a further enlarged fragmentary sectional view taken along a plane corresponding to line 4—4 of FIG. 2;

FIG. 5 is an enlarged fragmentary sectional view show-

2 ing a portion of the apparatus illustrated in FIG. 3 but with the actuator only partially depressed or released;

FIGS. 6 and 7 are fragmentary sectional views similar to FIGS. 2 and 3 but illustrating a modified form of the present invention;

FIG. 8 is an enlarged transverse sectional view taken along a plane corresponding to line 8—8 of FIG. 6;

FIG. 9 is a front elevational view of a further modified form of the present invention;

FIG. 10 is a sectional view taken along a plane corresponding to line 10—10 of FIG. 9;

FIG. 11 is a fragmentary sectional view showing a portion of the apparatus of FIG. 10 but with the actuator in an alternate position;

FIG. 12 is a fragmentary sectional view taken along a plane corresponding to line 12—12 of FIG. 9;

FIG. 13 is a wiring diagram showing a typical arrangement of circuit elements;

FIG. 14 is a vertical sectional view illustrating a package for series of probe shields, the probe itself also being illustrated;

FIG. 15 is an axial sectional view illustrating a probe shield installed upon a probe;

FIG. 16 is an enlarged, fragmentary sectional view illustrating the manner in which the probe shield may be removed from the probe; and FIG. 17 is a pictorial view of the package as shown in FIG. 14.

In FIG. 1 there is illustrated an indicator needle 10 cooperable with a dial plate 12 both enclosed in a generally rectangular relatively thin case 14. The case may be made of plastic, as for example, high impact type polystyrene. Markings on the scale 12 are intended to indicate body temperature.

The pointer or indicator needle 10 as shown in FIG. 2 and in FIG. 4 is mounted upon a pivot pin 16. The pivot pin 16 is carried on a suitable bearing structure 18. The pivot pin carries a suitable armature inside the bearing structure 18 that cooperates with the poles 19 and 20 of a horseshoe magnet 22. The angular orientation of the indicator needle 10 is determined by the magnitude of current through a coil wound upon the armature. The magnet 22, the indicator 10 and the bearing structure 18 may comprise a standard subassembly.

In the present example, the magnet 22 is mounted in the case 14 by a back plate 24 that may also be made of plastic material. Screws 26 and 28 surrounded by spacer sleeves 30 and 32 enter tapped holes in the arms of the magnet 22. The magnet is located generally in a median plane parallel to the back plate 24 in the upper part of the case 14, and with the poles 19 and 20 downwardly oriented.

The back plate 24 in the present example has a marginal flange 34 that fits within the rear opening 36 of the case 14, and solvent welded thereto.

The end of the needle 10 is located near the upper end of the case adjacent the front wall 38 thereof. The end of the needle 10 is spaced from the connecting portion of the magnet 22 by intermediate offsetting bends of the needle. The end of the indicator 10 (FIG. 5) may be viewed through a window 40 fastened at an opening 42 of the front wall 38, by the aid of a suitable clamping device 44.

The dial plate 12 may be formed from plastic sheet material. Preferably it has slight flexible and resilient characteristics. Polyethylene material may be suitable. Generally the plate 12 projects downwardly between the needle 10 and the magnet 22 with its upper end located above the magnet and the needle end. The dial plate 12 is supported at its lower end (FIG. 4) by the aid of two screws 46 and 48. These screws pass with clearance through apertures at 50 in the dial plate 12 and are threadedly received in recesses 52 formed in embossments 54 and 56 attached to the lower ends of respective magnet arms just above the poles 19 and 20.

Normally, the upper end of the dial plate is spaced from the upper end of the magnet by a distance corresponding to the height of the embossments 54 and 56. In this position the needle 10 is engaged by the dial plate and very slightly flexed outwardly thereby. In this position, the needle 10 is frictionally restrained from movement. A spring in the form of a cushion or pad 58 biases the dial plate so that it engages the needle 10. The cushion 58 may be cemented either to the dial plate or the magnet.

Due to the clearance between the screws 46 and 48 and the apertures as at 50 of the dial plate 12, and also due to the flexible nature of the dial plate itself, the upper or free end of the dial plate may be moved inwardly, thereby releasing the needle 10. The plate 12 thus serves as a releasable clamp or restraining means for the needle 10.

The manner in which the dial plate is moved inwardly will be described hereinafter.

In order to apply an appropriate current to the meter, a main operating switch 60 must be moved to an operating position. This switch comprises three flexible spring arms 62, 63 and 64. These arms are all mounted, with suitable insulation, at the back of the upper portion of the magnet 22. The central arm 63 serves as a movable control means; and has a contact 65 that normally engages a contact 66 of the arm 64. This contact 65 is normally spaced from a contact 67 carried by the other end arm 62. Upon flexure of the central arm to the left or toward the back plate 24, the contact 65 moves away from contact 66 and moves into an operating position in which it engages contact 67 to initiate operation of the meter circuit.

The central arm 63 projects upwardly beyond the magnet whereby it may be flexed in a manner to be hereinafter described. When the switch 60 is operated, the thermal conditions of an electrically energizable temperature sensing element or probe 70 (FIG. 1) influence the pointer or needle 10 in a well-known manner. The probe 70 may incorporate a thermistor or other suitable temperature responsive element. Energy is consumed by the element, which is dissipated as heat. A cable 72 carries suitable leads whereby elements (not shown) within the case 14 can be connected in circuit with the thermistor element. A suitable strain-relieving device 74 may attach the cable to the case 14. In the present instance the cable 72 is attached at the upper wall of the case 14.

For flexing both the dial plate 12 and the switch arm 63, a common manual actuator 76 is provided. The actuator 76 includes a plunger 78 mounted by other parts of the actuator for movement beneath the top wall of the case and in a path that intercepts the top of the dial plate 12 and the switch arm 63.

An apertured cup 80 has a flange secured about the edges of an access aperture 82 in the case. The outer end of the plunger works in, and is guided by, the cup 80. A flange 84 on the plunger slides in the cup walls while the plunger slides in the aperture in the bottom of the cup. A spring 86 in the cup urges the plunger outwardly through the access aperture 82. A pliant cup 88 surrounds the projecting end of the plunger and limits its outward movement. The cup 88 seals the access aperture 82 by having its flange clamped between the case and the flange of the cup 80. Upon a slight inward movement, the end of the plunger 78 engages the spring contact arm 63, moves it away from back contacting position and into front contacting position. A circuit dependent upon engagement of contacts 65 and 66 is interrupted and the operating circuit dependent upon engagement of contacts 65 and 67 is initiated.

In the position illustrated in FIG. 5, the contacts 65 and 67 are just engaged; yet the needle 10 is still restrained by the dial plate 12. Upon further inward movement of the plunger 78, the indicator 10 is released. Thus the circuit is operated and the indicator is released in a defined sequence of operation. For this purpose, the plunger has an abutment in the form of a shoulder 90 that engages about an aperture 92 in the dial plate 12 and through which the reduced end 94 of the plunger passes. The parts are so proportioned and positioned that the shoulder 90 engages the dial plate 12 after the contacts 67 and 65 are engaged. The circuit established by the switch 60 being then operative, the dial 10 immediately swings to the position indicative of the temperature of the probe 70.

A timer circuit later to be described causes the circuit to be operative for a small period of time, say three to five seconds, despite continued closure of the contacts 65 and 67. However, this period of time is quite long enough for the plunger to be depressed and released. Upon release of the plunger within the time period, the dial plate 12 first engages the pointer 10 and secures the reading prior to disengagement of the contacts 65 and 67. Thus the indicator is clamped and the circuit interrupted in reverse sequence. Upon full release of the plunger 78, the operating circuit is opened and the switch 60 returns to back contacting position.

The actual meter circuit elements (not shown) may be suitably mounted within the case. A sleeve 96 (FIG. 2) for receiving a battery 98 is mounted on the bottom wall of the case 14. The interior of the sleeve is accessible through a threaded opening 100 closed by a headless screw 102.

If desired, a suitable lamp (not shown) may be mounted in the casing 14 for illumination of the indicator 10 and dial plate 12.

In the form of the invention illustrated in FIGS. 6, 7 and 8, a reed switch 104 (FIG. 8) may be provided in place of the switch structure 60. The reed switch 104 may be a standard unit that responds to the application of a magnetic field for movement of a contact arm or movable control means from one contact and into engagement with another. Optionally, the switch 104 could be of a single pole type for controlling a relay circuit or the like. The reed switch 104 shown in FIG. 8 is mounted upon the rear surface of the magnet structure 22a.

In order to move the reed switch 104 to its operating position and in order to move the dial plate 12a, a common manual actuator in the form of a magnet 106 is provided. The magnet 106 is generally of flat cylindrical form adhered to the inner surface of a flexible resilient diaphragm 108. The diaphragm 108 is accessible at an aperture 110 in a back plate 112 for the casing 114. A marginal portion of the diaphragm 108 is adhered by suitable clamping ring 116 about the edges of the aperture 110.

Normally the diaphragm falls at the plane of the aperture 110, as shown in FIGS. 6 and 8. The magnet 106 is capable of entering between the magnet legs, but is normally slightly spaced therefrom. Upon movement of the magnet 106 inwardly as indicated in FIG. 7 and in phantom lines in FIG. 8, the magnet comes into proximity with the reed switch 104 and operates the same.

Upon further inward movement, the dial plate 12a is attracted so as to release the indicator 10a in sequence. The dial plate 12a thus serves as a releasable restraining means. For this purpose the dial plate 12a is made of magnetically permeable material, such as soft steel or the like. Optionally, an armature of magnetic material could be adhered to the rear surface thereof.

Except as noted, the apparatus shown in FIGS. 6, 7 and 8 is similar to the form described in FIGS. 1 to 5. The same desirable sequence of operation results.

In the form of the invention illustrated in FIGS. 9 to 12, a case 130 is provided in which a meter magnet 132 is mounted in the lower end. A window 134 in the case permits the viewing of an indicator needle 136 fastened to the magnet 132. A dial plate 138, which serves as a releasable restraining means, is provided that is made of suitable magnetically permeable material, and its upper end projects beyond the needle.

A reed switch 140, similar to the reed switch 104, is provided for controlling the application of power to the circuit for the meter. The reed switch 140 is mounted on the inside of the case by the aid of a suitable spring bracket 142. A bar magnet 144 movable along the exterior of the case is capable of operating the reed switch 140 and is also capable of attracting the dial plate 138, and thus serves as a common manual actuator therefor. The dial plate 138 is mounted in a manner similar to the dial plates of the previous form. However, absent a magnetic field, the dial plate 138 does not engage or restrain the needle 136. Thus the actuator 136 is normally released.

The magnet 144 is guided for movement in a path for magnetically influencing the switch 140 and the dial plate in suitable sequence. For this purpose, a rectangular recess 146 is formed in the front wall 148 of the case with its lower wall just above the dial plate 138. The magnet 144, which may be encased in suitable plastic material 150, is transversely slidable in the recess with the ends of the magnet guided by the side walls of the recess. At the lowermost position of the magnet 144, as illustrated in FIG. 11, the dial plate 138 is attracted so as to move into engagement with the indicator 136. In this lowermost position, the reed switch 140 is also operated. In order to cause the switch 140 to operate before the dial plate 138 is attracted, the magnet 144 is normally located upwardly beyond a position of influence both with respect to the reed switch 140 and the dial plate 138 and as indicated by the legend "off" in FIG. 9. When it is desired to obtain a reading of temperature, the switch 140 and restraining means 138 are operated in sequence. Thus as the bar magnet 144 is moved downwardly in the recess 146, the switch 140 is first operated, as in FIG. 10. As the magnet continues downward travel beyond the position illustrated in FIG. 10, the dial plate 138 is attracted to hold the indicator 136 in position while the switch 140 is still attracted, thereby securing the reading.

A transient timer circuit interrupts the energization of the operating circuit despite continued closure of the switch 140. Accordingly, the drain upon the battery is avoided, yet the indicator needle is still restrained. To reset the meter circuit, the magnet 144 must move beyond a position of influence relative to the switch 140, as by return to the "off" position.

In the present instance, movement of the actuator 144 to an off position releases the dial plate 138 and the indicator 136 returns to a zero position.

The magnet 144 is movable to the upper position in the recess 146 in order to operate a switch 152 for testing the battery.

The magnet 144 is releasably held in the recess by the aid of a pair of strips 154 of magnetic material. These strips are located on opposite sides of the recess on the inside of the case, as shown in FIG. 12. The magnetic attraction between the strip 154 and the magnet 144 maintains the magnet in whatever position the magnet is placed.

The case of all forms are sealed for cleaning by suitable solvents or solutions.

The transient timer circuit shown in FIG. 13 is illustrative of one that may be usable in connection with the thermometer. The meter circuit is shown diagrammatically by a rectangle 160 that may include a suitable bridge structure. The meter circuit is completed upon closure of a normally open relay switch 162. The relay switch 162 is operated by a relay coil 164 that serves as a means for powering the indicator positioning or meter circuit 160. The coil 164 derives a pulse of energy from a charge stored in a condenser 166. A ground connection 168 is provided for one terminal of the condenser 166 and one terminal of the coil 164.

The other terminal of the condenser connects to a contact 65a of a switch arm 63a, respectively corresponding to contact 65 and arm 63 of the switch 60 shown in FIG. 5. Normally the contact 65a engages a contact 66a connected to a voltage source (+), but the contact 65a can be moved to engage the contact 67a that connects to the other terminal of the coil 164. The contacts 66a and 67a correspond to the contacts 66 and 67 of the switch 60 of FIG. 5.

Normally the condenser 166 is charged from the source (+). When the switch arm 63a moves, a controlled quantity of energy is applied to the coil 164 and the relay is attracted for a time period dependent upon the design of the circuit elements. Return of the arm 63a to the position of FIG. 13 reconnects the condenser 166 to the battery, and thus achieves the resetting of the transient circuit.

The probe 70 as shown in FIGS. 1 and 14 to 17 has a long thin tapered part 176 at the very end of which the small sensing element is located. The tapered part 176 projects from the smaller end of a frustoconical base 180. The cable 72 attaches at the larger end of the base 180. The peripheral area of the frustoconical flange is free.

A sheath 182 (FIG. 15) made of resilient, flexible, rubber-like or plastic material can be telescoped over the probe 70 for sanitary purposes. The rubber sleeve has bonded thereto an aluminum tip 184 for rapid transfer of heat to the very end of the probe at which the sensing element is located. The opposite end of the sleeve 182 has a circular transverse flange as at 185 forming a snap ring adapted to latch over the frustoconical base 180. When so latched, the sheath is preferably longitudinally tensioned in order to ensure firm engagement between the tip 184 and the probe for efficient heat transfer. The sheath 182 can be released by flexing the flange 185 away from the frustoconical base 180 as indicated in FIG. 16. Accordingly, without touching the operative end of the sleeve 182, the probe can be removed therefrom.

A series of such sheaths 182 may be accommodated in a package 188 (FIGS. 14 and 17) of generally rectangular form. One end of the package is provided with an access aperture 190 provided with a series of radial slits 192 (FIG. 17) so that the effective diameter of the aperture 190 can be enlarged. A series of nested sheaths 182 are accommodated in the package 188 as indicated in FIG. 14, with the flange of the end sheath engaging edges of the aperture 190 on the inside of the box. A light compression spring 194 has one end engaging the bottom of the box and its other end engaging the flange of the innermost sheath to urge all of the sheaths upwardly toward opening 190.

Upon adequate movement of the probe 70 into the access aperture 190, the frustoconical base 180 ultimately snaps through the locking flange 184. Thereupon, the probe is removed, carrying with it the sheath so attached, the slits 192 allowing flexure for passage of the flange. The next sheath moves into position.

The inventor claims:

1. In a clinical thermometer: a temperature indicator; a temperature sensing element; movable control means for causing the sensing element to operate the indicator; releasable restraining means for the indicator; and a common manual actuator for the releasable restraining means and the movable control means.

2. In a clinical thermometer: a temperature indicator; a temperature sensing element; movable control means for causing the sensing element to operate the indicator; releasable restraining means for the indicator; said restraining means being movable to frictionally engage said indicator; and a common manual actuator for operating the control means and the restraining means in sequence.

3. In a clinical thermometer: a temperature indicator; an electrically energizable temperature sensing element; a timer; a manual actuator movable to one position to initiate the timer cycle; means resetting said timer upon movement of said actuator to another position; and energy consuming means causing the sensing element to operate the indicator during operation of the timer whereby a metered quantity of energy is consumed for each temperature indication.

4. In a clinical thermometer: a temperature indicator; a temperature sensing element; an electrically energizable timer; a manual actuator movable to one position to initiate the timer cycle; means resetting said timer upon movement of said actuator to another position; energy consuming means causing the sensing element to operate the indicator during operation of the timer whereby a metered quantity of energy is used for each temperature indication, and releasable restraining means for the indicator controlled by said actuator.

5. In a clinical thermometer: a temperature indicator; a temperature sensing element; an electrically energizable timer; a manual actuator movable to one position to initiate the timer cycle; means resetting said timer upon movement of said actuator to another position; energy consuming means causing the sensing element to operate the indicator during operation of the timer whereby a metered quantity of energy is used for each temperature indication; releasable restraining means for the indicator and controlled by said actuator; said restraining means being movable to frictionally engage said indicator; said actuator operating the timer and the restraining means in sequence.

6. In a clinical thermometer: a temperature indicator; a temperature sensing element; movable control means for causing the sensing element to operate the indicator; releasable restraining means for the indicator; said restraining means being movable to frictionally engage said indicator; and a common manual actuator for operating the control means and the restraining means in sequence so that the control means causes the indicator to operate prior to application of restraint to the indicator.

7. In a clinical thermometer: a temperature indicator; a temperature sensing element; an electrically energizable timer; a manual actuator movable to one position to initiate the timer cycle; means resetting said timer upon movement of said actuator to another position; energy consuming means causing the sensing element to operate the indicator during operation of the timer whereby a metered quantity of energy is used for each temperature indication; releasable restraining means for the indicator and controlled by said actuator; said restraining means being movable to frictionally engage said indicator; said actuator operating the timer and the restraining means in sequence so that the indicator is released only after the timer cycle is initiated.

8. In a clinical thermometer: a temperature indicator; a temperature sensing element; movable control means for causing the sensing element to operate the indicator; releasable restraining means for the indicator; and a common actuator for the releasable restraining means and the movable control means, said restraining means being normally applied, said control means having a normal inactive position and an active position; means forming a first lost motion connection between the control means and the actuator; means forming a second lost motion connection between the restraining means and the actuator; said lost motion connections being timed whereby the control means is moved to an active position before the restraining means is released and whereby the restraining means is applied before the control means returns to its inactive position.

9. In a clinical thermometer: a temperature indicator; a temperature sensing element; magnetically movable control means operatively connecting the sensing element to the indicator; a normally applied restraining means for the indicator, and magnetically movable to released position; and a common manually movable magnetic actuator for the control means and the restraining means.

10. In a clinical thermometer: a temperature indicator; a temperature sensing element; magnetically movable control means operatively connecting the sensing element to the indicator; a normally applied restraining means for the indicator, and magnetically movable to released position; a common manually movable magnetic actuator for the control means and the restraining means; and means determining a path of movement of said actuator with respect to said control means and said restraining means, said path being so situated as to cause said control means to operate before the restraining means is released upon movement of said actuator to operate the thermometer, and to reapply the restraining means during operation of the control means as the actuator is returned.

11. In a clinical thermometer: a temperature indicator; a temperature sensing element; magnetically movable control means for causing the sensing element to operate the indicator; normally released restraining means for the indicator, and magnetically movable to applied position; and a common manually movable magnetic actuator for the control means and the restraining means.

12. In a clinical thermometer: a temperature indicator; a temperature sensing element; a timer; magnetically operated control means movable to one position to initiate the timer cycle; means dependent upon the operation of the timer for causing the sensing element to operate the indicator; normally released restraining means for the indicator, and magnetically movable to applied position; a common manually movable magnetic actuator for the control means and the restraining means; and means determining a path of movement of the actuator for operating the control means and the restraining means in sequence.

13. In a clinical thermometer: a temperature indicator; an electrically energizable temperature sensing element; a circuit for positioning the indicator in accordance with the temperature sensed by said element; a switch movable from an off position to an operating position; a transient circuit for powering the indicator positioning circuit, and providing a controlled quantity of energy for said indicator postioning circuit upon movement of said switch to its said operating position; and means resetting said transient circuit upon movement of said switch away from its said operating position.

14. The combination as set forth in claim 13 together with a releasable clamp for the indicator for securing a reading of the indicator; and a manually movable actuator for operating the clamp and said switch in sequence.

15. The combination as set forth in claim 13 together with a releasable normally applied clamp for the indicator for securing a reading of the indicator; and a manually movable actuator for moving the switch to its operating position and then releasing said clamp.

16. The combination as set forth in claim 13 together with a normally released clamp for the indicator for securing a reading of the indicator; and a manually movable actuator for moving the switch to its operating position and then operating the clamp while the switch is in its said operating position.

17. The combination as set forth in claim 16, in which said clamp and said switch are both operated in response to the existence of a magnetic field, said actuator including a permanent magnet for creating the magnetic field conditions to which said clamp and switch respond.

18. In a clinical thermometer: a temperature indicator; an electrically energizable temperature sensing element; a circuit for positioning the indicator in accordance with the temperature sensed by said element; a switch movable from an off position to an operating position to cause the sensing element to operate the indicator; a normally released clamp for securing a reading of the indicator; said switch and said clamp both being operated in response to the existence of a magnetic field; and an actuator including a permanent magnet and guided in a path of movement for moving the switch to its operating position and operating the clamp while the switch is in its said operating position.

(References on following page)

References Cited by the Examiner

UNITED STATES PATENTS

| | | | |
|---|---|---|---|
| 1,614,535 | 1/1927 | Packard | 73—342 |
| 2,098,650 | 11/1937 | Stein | 73—362 |
| 2,268,494 | 12/1941 | Welcome | 324—157 |
| 2,339,127 | 1/1944 | Woolman | 73—342 |
| 2,365,556 | 12/1944 | Karg | 206—63.2 |
| 2,427,931 | 9/1947 | Spanner | 73—342 |
| 2,612,780 | 10/1952 | De Bruyne | 73—362 |
| 2,910,174 | 10/1959 | Reid | 206—16.5 |
| 2,969,141 | 1/1961 | Katzin | 206—16.5 |
| 3,017,990 | 1/1962 | Singerman | 206—63.2 |
| 3,022,460 | 2/1962 | Schneider | 324—140 |

LOUIS R. PRINCE, *Primary Examiner.*

ISAAC LISANN, C. CARTER ELLS, D. M. YASICH,
*Assistant Examiners.*